United States Patent Office 3,538,137
Patented Nov. 3, 1970

3,538,137
HYDROLYZABLE ORGANOSILANES DERIVED FROM SILICON HYDROGEN COMPOUNDS AND TRIMETHYLOL ALKANE DERIVATIVES
Richard V. Viventi, Schenectady, N.Y., assignor to General Electric Company, a corporation of New York
No Drawing. Filed Oct. 30, 1967, Ser. No. 679,155
Int. Cl. C07f 7/04, 7/18
U.S. Cl. 260—448.2                                 4 Claims

ABSTRACT OF THE DISCLOSURE

This invention relates to organosilicon compounds having the formula:

$$\text{R}'\text{CH}_2\overset{\underset{\displaystyle \text{CH}_2\text{OR}}{|}}{\underset{\displaystyle \text{CH}_2\text{OR}}{|}}{\text{C}}-\text{CH}_2\text{O}(\text{CH}_2)_n\text{Si}(Y)_a(X)_{3-a}$$

which are prepared by reacting a hydrolyzable silane containing a silicon hydrogen bond with an alkenyloxy derivative of a trimethylol alkane, where X is a hydrolyzable group, R is a member selected from the class consisting of hydrogen, alkenyl radicals of 2 to 4 carbon atoms, and trialkylsilyl radicals, R' is a member selected from the class consisting of hydrogen or methyl, Y is a monovalent hydrocarbon radical, $a$ is a whole number equal to from 0 to 2, and $n$ is a whole number from 2 to 4. These compositions are useful as glass fiber sizing agents.

---

This invention relates to hydrolyzable organosilicon compounds containing from one to three silicon-bonded hydrolyzable groups, one silicon-bonded non-hydrolyzable group derived from a derivative of a trimethylol alkane, and up to two monovalent hydrocarbon radicals.

In particular, the present invention relates to organosilanes having the formula:

(1)     $\text{R}'\text{CH}_2\overset{\underset{\displaystyle \text{CH}_2\text{OR}}{|}}{\underset{\displaystyle \text{CH}_2\text{OR}}{|}}{\text{C}}-\text{CH}_2\text{O}(\text{CH}_2)_n\text{Si}(Y)_a(X)_{3-a}$ where X is a hydrolyzable group selected from the class consisting of chlorine,

groups and —OR" groups; R is a member selected from the class consisting of alkenyl radicals having from 2 to 4 carbon atoms and —Si(R")₃ radicals; R' is a member selected from the class consisting of hydrogen and methyl; R" is a lower alkyl radical; Y is a member selected from the class consisting of lower alkyl radicals and monocyclic aryl radicals; $n$ is a whole number from 2 to 4, inclusive; and $a$ is a whole number equal to from 0 to 2, inclusive; and where R, in addition, can be hydrogen when X is

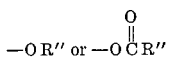

The silanes of the present invention are useful as glass fiber sizing agents which improve the ability of glass fibers to reinforce thermoplastic resins, such as polystyrene, polyvinyl chloride, and the like.

Illustrative of the radicals represented by R" in the substituents of Formula 1 and thus by the radicals within the scope of X and R', are the lower alkyl radicals containing from one to seven carbon atoms, e.g., methyl, ethyl, propyl, butyl, heptyl, etc., radicals. The lower alkyl radicals within the scope of Y are the same as those described above. The monocyclic aryl radicals within the scope of Y include phenyl, tolyl, xylyl, etc. In the preferred embodiment of my invention, the —OR" radical is methoxy or ethoxy, the preferred —Si(R")₃ radical is the trimethylsilyl radical, and the preferred Y radical is methyl.

The exact nature of the components of the present invention can be best understood by their method of preparation which comprises, in a preferred method of preparation, the addition of a hydrolyzable silane having the formula:

(2)                              $\text{HSi}(Y)_a(X)_{3-a}$ to an alpha-olefinically unsaturated ether having the formula:

(3)     $\text{R}'\text{CH}_2\overset{\underset{\displaystyle \text{CH}_2\text{OR}}{|}}{\underset{\displaystyle \text{CH}_2\text{OR}}{|}}{\text{C}}-\text{CH}_2\text{O}-(\text{CH}_2)_{n-2}\text{CH}=\text{CH}_2$ where X, R, R', Y, $a$ and $n$ are as previously defined.

The hydrolyzable silanes within the scope of Formula 2 are common materials and include trichlorosilane, methyldiacetoxysilane, methylphenylacetoxysilane, trimethoxysilane, triethoxysilane, etc. While the unsaturated ethers within the scope of Formula 3 are not as widely commercially known materials as the silanes of Formula 2, the unsaturated ethers of Formula 3 are also known in the art and are derivatives of either trimethylolethane or trimethylolpropane. The particular derivatives are monoalkenyl, dialkenyl, or trialkenyl ethers of the trimethylolethane or trimethylolpropane. The method of preparing these materials is well known and, for example, the allyl ethers are prepared by reacting allyl alcohol with, for instance, trimethylolpropane under ether-forming conditions to form the monoallyl ether of trimethylolpropane which is within the scope of Formula 3 when R is hydrogen, R' is methyl, and $n$ has a value of 3. The corresponding diallyl ether derivatives are prepared by reacting 2 moles of allyl alcohol with one mole of trimethylolpropane and the trisallyl ether is prepared by reacting 3 moles af allyl alcohol with the trimethylolpropane. Other derivatives of the trimethylolalkanes are prepared by reacting butenol-3 to form ethers within the scope of Formula 3, where $n$ is equal to 4, or by reacting vinyl acetate with trimethylolethane to produce compositions with the scope of Formula 3 in which $n$ is equal to 2.

Derivatives of the trimethylolalkanes in which one or both of the R groups are trialkylsilyl are prepared by reacting one of the methylol groups of the unsaturated ether with a trialkylchlorosilane, employing one mole of the trialkylchlorosilane per mole of methylol group it is desired to replace. For example, when one mole of the monoallyl ether of trimethylolpropane is reacted with 2 moles of trimethylchlorosilane, the resulting product falls within the scope of Formula 3 when R is trimethylsilyl, R' is methyl, and $n$ is equal to 3.

The method of forming the unsaturated alcohol ethers of the trimethylolalkanes is well known in the art and need not be discussed in detail. The preparation of ethers within the scope of Formula 3 in which R is a trialkylsilyl group is relatively straightforward and is accomplished by merely mixing the unsaturated alcohol ether and the material which provides the source for the trialkylsilyl radicals in a suitable reaction vessel and heating the two reactants at a temperature sufficiently high to cause evolution of the gaseous byproduct of the reaction. The temperature of the reaction mixture is permitted to increase until no more gaseous byproduct is evolved and then the products are fractionally distilled to produce the desired product.

The source of the trialkylsilyl groups can be either a chlorosilane having the formula:

(4)  ClSi(R″)$_3$ where R″ is as previously defined, or an appropriate silazane, such as hexamethyldisilazane which has the formula:

(5)  (CH$_3$)$_3$SiNHSi(CH$_3$)$_3$

In the case of the chlorosilane of Formula 4, the gas evolved during the reaction is hydrogen chloride, while in the case of hexamethyldisilazane, the gaseous byproduct of the reaction is ammonia. The temperature at which the reaction mixture is heated to remove the gaseous byproduct can vary within wide limits but generally satisfactory reaction rates are obtained with reaction temperatures in the range of from about 70 to 140° C., with the reaction time varying from several hours up to 8 to 10 hours, depending upon the particular reactants and the reaction conditions.

Once having obtained the desired ether within the scope of Formula 3, this ether is reacted with the silane of Formula 2 under conditions which facilitate the addition of the Si-H group of the silane across the olefinic double bonds of the ether. Reaction conditions required to effect the reaction involve elevated temperatures, e.g., temperatures of from about 50 to 150° C., and a catalyst to facilitate the reaction. In general, the catalyst is either elemental platinum or a platinum compound catalyst, with the platinum compound catalysts being most preferred. Illustrative of the type of platinum catalyst which can be used for the addition reaction are the elemental platinum catalysts shown in Pat. 2,970,150—Bailey; the chloroplatinic acid shown in Pat. 2,823,218—Speier et al.; the catalyst prepared by reacting chloroplatinic acid with alcohol, aldehydes or ethers of Pat 3,220,972—Lamoreaux; the platinum-olefin catalyst shown in Pat. 3,159,601—Ashby; and the platinum-cyclopropane catalysts shown in Pat. 3,159,662—Ashby.

The amount of catalyst employed in effecting the reaction can vary within wide limits, with satisfactory reaction rates being obtained when the catalyst is present in an amount equal to from one platinum atom per thousand to one platinum atom per 100,000 unsaturated groups in the unsaturated ether. Under these conditions of temperature and catalyst concentration, complete reaction is effected in times which can vary from several minutes to several hours.

The proportion of the silane of Formula 2 and the unsaturated ether of Formula 3 is selected so as to insure optimum reaction rate and optimum concentration of reaction product. Thus, where the unsaturated ether of Formula 3 contains only one unsaturated group per molecule, it is convenient to employ one mole of the silane per mole of the unsaturated ether. On the other hand, when the unsaturated ether contains more than one unsaturated group, the amount of silane of Formula 2 is selected to correspond to the number of unsaturated groups which it is desired to react. Therefore, starting with the appropriate unsaturated ether and the desire to react one, two or three of the available unsaturated groups, the amount of silane could be one, two or three moles per mole of the ether. By controlling the reactants to stoichiometric proportions, the possibility of wasting either of the reactants is minimized. The course of reaction can be followed by infrared analysis and, upon completion of the reaction, the desired reaction product may be purified by fractional distillation.

Where the desired product within the scope of Formula 1 is one in which R is equal to hydrogen, two methods are available for producing the product. In the first method, a starting reactant within the scope of Formula 3 in which R is hydrogen can be reacted with a silane of Formula 2. While this does produce a minor yield of the desired product, it is found that an uneconomically high proportion of byproducts are obtained. Accordingly, it is preferred to prepare compositions within the scope of Formula 1 in which R is hydrogen from corresponding materials within the scope of Formula 1 in which R is trimethylsilyl. The trimethylsilyl compound within the scope of Formula 1 can be converted to the corresponding methylol material by reacting the trimethylsilyl derivative with a lower alcohol having the formula:

(6)  R″OH

This will result in the formation of an alkoxysilane and a methylol derivative. Also, if the X group of the product of Formula 1 were chlorine prior to the reaction with the lower alcohol, this hydrolyzable group will be converted to an alkoxy group corresponding to the alcohol employed in the reaction.

The conversion of the trialkylsilyl derivative to the methylol derivative is effected by merely adding the alcohol of Formula 6 to the trimethylsilyl derivative within the scope of Formula 1, heating the mixture at a temperature just below the boiling point of the alcohol, and then at a temperature sufficient to remove any alkoxysilanes and unreacted alcohol formed during the reaction. Fractional distillation will result in the purified product.

The following examples are illustrative of the practice of my invention and are not intended for purposes of limitation. All parts are by weight.

EXAMPLE 1

To a reaction vessel is added 522.7 grams (3 moles) of the monoallyl ether of trimethylolpropane and 500.4 grams (3.1 moles) of hexamethyldisilazane. The reaction mixture is heated at a pot temperature which slowly rises from 75 to 140° C. over a 24-hour period, during which time evolution of ammonia gas begins and is completed. The resulting material is vacuum-flash distilled at 6 to 7 mm. and a temperature of 20 to 30° C. and then fractionally distilled to produce 877 grams of product having a boiling point of 108° C. at 1.5 mm. and which has a refractive index $n_D{}^{25}=1.4258$. Infrared analysis, which shows peaks at 6.1 microns for the allyl radical, at 8.0 microns for the silicon-methyl group, and at 9.25 microns for the silicon-oxygen-carbon linkage confirms the identity of this material as the trimethylsilyl derivative having the formula:

(7)   CH$_3$CH$_2$C(CH$_2$O Si(CH$_3$)$_3$)(CH$_2$O Si(CH$_3$)$_3$)—CH$_2$O CH$_2$CH$_2$=CH$_2$

To a reaction vessel is added 318.6 grams (1.0 mole) of the trimethylsilyl derivative prepared above, 164.3 grams (1.0 mole) triethoxysilane, 4.5 grams of benzene, and a sufficient amount of a 5 weight percent solution of chloroplatinic acid in isopropanol to provide 1 atom platinum per 10,000 unsaturated groups in the reaction mixture. The reaction mixture is maintained at a temperature which varies from 80 to 110° C. over a 12-hour period and the reaction mixture is then flash distilled to remove all materials having boiling points up to 110° C. at 0.75 mm. and 209 grams of a product boiling at 160 to 175° C. at 12 mm. is collected. This material, which has a refractive index $n_D{}^{20}=1.4236$ is identified by infrared peaks at 8.0 microns corresponding to the silicon-methyl linkages, at 9.25 microns corresponding to the silicon-oxygen-carbon linkage, and at 10.4 microns corresponding to the silicon-oxygen-methyl group as the product having the formula:

(8) 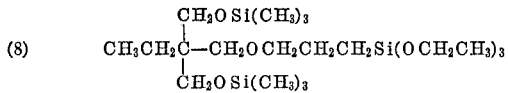

This product is within the scope of Formula 1 when R is trimethylsilyl, R' is methyl, X is ethoxy, and $n$ is equal to 3. This material was a clear, white liquid.

EXAMPLE 2

The product of Example 1 is converted to the methylol derivative by adding to a reaction vessel 120.7 grams (0.25 mole) of the product of Example 1 and 69 grams (1.5 moles) of ethanol. This mixture is heated at atmospheric pressure and an azeotropic mixture of ethanol and trimethylethoxysilane is removed at 66.5° C. and 760 mm. Flash evaporation is employed to remove remaining ethanol to produce 72.6 grams of a clear liquid having the formula:

(9) 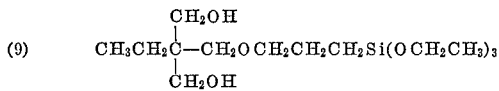

The identity of the product is confirmed by infrared analysis which showed a peak at 2.93 microns corresponding to the methylol group and peaks at 9.3 and 10.4 microns corresponding to the silicon-ethoxy group. The identity is further confirmed by the disappearance of the peak at 8.0 microns which corresponds to the silicon-methyl linkage. Chemical analysis of the product shows the presence of 53.78% carbon, 9.60% hydrogen, and 8.90% silicon as compared with the theoretical values of 53.2% carbon, 10.12% hydrogen, and 8.29% silicon.

EXAMPLE 3

To a reaction vessel is added 172 grams (1.0 mole) of the divinyl ether of trimethylol ethane and 150.5 grams (1.0 mole) of triethylchlorosilane. This mixture is heated at a temperature of 125° C. for 8 hours, during which time HCl evolution begins and finishes. This results in an intermediate product having the formula:

(10) 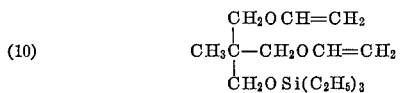

This product is purified by fractional distillation and 143 grams (0.5 mole) is added to a reaction vessel and .0259 gram of chloroplatinic acid-hexahydrate is added thereto. Over a 3-hour period, 68.0 grams of trichlorosilane is slowly added to the reaction vessel while the reaction mixture is maintained at a temperature of 120° C. for 8 hours. The progress of the reaction is followed by observation of the disappearance of the band corresponding to the Si-H linkage in the trichlorosilane. After the addition reaction is completed, the resulting reaction mixture is fractionally distilled to produce a compound having the formula:

(11) 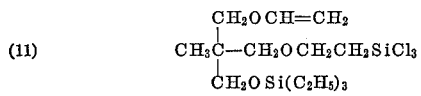

which is within the scope of Formula 1 when one of the R groups is vinyl, the other is triethylsilyl, R' is hydrogen, X is chlorine, and $n$ has a value of 2.

EXAMPLE 4

To a reaction vessel is added 252 g. (1.4 mole) of methylphenylacetoxysilane and 192 g. (0.7 mole) of the product prepared by reacting trimethylchlorosilane with the diallyl ether of trimethylol propane which adduct had the formula:

(12) 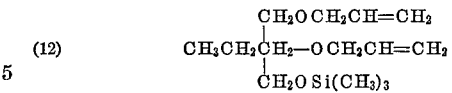

To this reaction mixture is then added a sufficient amount of a 5 weight percent solution of chloroplatinic acid in isopropanol to provide one atom platinum per 20,000 unsaturated groups in the reaction mixture and the reaction mixture is maintained at a temperature of about 100 to 120° C. over a 16-hour period. The reaction mixture is then flash distilled to remove all materials having a boiling point up to 135° C. at 0.5 mm. to produce a product within the scope of the present invention having the formula:

(13) 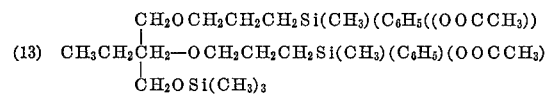

This product is a clear white liquid.

EXAMPLE 5

This example illustrates the use of the compositions of the present invention as glass fiber sizing agents. To 100 parts of a 0.5% aqueous acetic acid solution is added 2.8 parts of the trimethylol propane derivative of Example 2 and then 400 parts of chopped glass fibers having an average diameter of .00025 inch and an average length of about 3/16 inch are added. The glass fibers are then filtered from the solution and dried in a circulating air oven at 150° C. Thirty parts of this treated glass are mixed with 70 parts of powdered polystyrene and the resulting mixture is molded into several bars 5.0 inches long by 0.5 inch by 0.125 inch. The flexural strength of one of these bars is measured and found to be about 22,500 p.s.i. This compares with a flexural strength of only 16,500 p.s.i. when the procedure is repeated except that a control with untreated glass is employed. The flexural strength of one of the above bars is compared with that of a control after bars were placed in a 100 percent relative humidity environment maintained at 80° C. for one week. At the end of this time, the flexural strength of the treated material is about 20,700 p.s.i. as compared with a flexural strength of about 9100 p.s.i. for the control which has dropped to about 9100 p.s.i.

While the foregoing examples have illustrated many of the embodiments of my invention, it should be understood that my invention relates broadly to the class of hydrolyzable silanes within the scope of Formula 1 with all of the variations permitted in such compositions. All of such compositions are useful in treating glass fibers and, in addition, are also useful as treating agents for rendering silica and other materials hydrophobic and to improve their compatibility with various organic resins.

What I claim as new and desire to secure by Letters Patent of the United States is:

1. Hydrolyzable organosilanes having the formula:

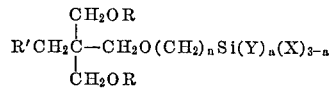

where X is a hydrolyzable group selected from the class consisting of chlorine,

groups and —OR'' groups; R is a member selected from the class consisting of alkenyl radicals having from 2 to 4 carbon atoms and —Si(R'')$_3$ radicals; R' is a member selected from the class consisting of hydrogen and methyl; R'' is a lower alkyl radical; Y is a member selected from the class consisting of lower alkyl radicals and monocyclic aryl radicals, $a$ is a whole number equal to from 0 to 2, inclusive, and $n$ is a whole number equal to from 2 to 4, inclusive.

2. Organosilanes of claim 1 in which X represents —OR" groups.

3. Organosilanes of claim 1 in which R' is methyl.

4. A hydrolyzable organosilane having the formula:

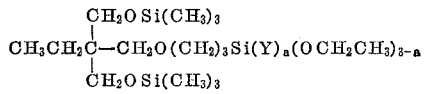

where Y is a member selected from the class consisting of lower alkyl radicals and monocyclic aryl radicals, and $a$ is a whole number equal to from 0 to 2, inclusive.

References Cited
UNITED STATES PATENTS

| | | | |
|---|---|---|---|
| 2,920,092 | 1/1960 | Bailey | 260—448.2 |
| 3,243,475 | 3/1966 | Reischl et al. | 260—448.8 XR |
| 3,317,460 | 5/1967 | Clark et al. | 260—448.8 XR |
| 3,355,473 | 11/1967 | Clark et al. | 260—448.2 |
| 3,381,019 | 4/1968 | Morehouse | 260—448.8 XR |
| 3,388,144 | 6/1968 | Musolf et al. | 260—448.8 |

HELEN M. McCARTHY, Primary Examiner

P. F. SHAVER, Assistant Examiner

U.S. Cl. X.R.

106—287; 117—124; 260—46.5, 448.8